Jan. 6, 1953     A. A. CORDER     2,624,473
ROTOR CARRIER
Filed July 17, 1946     4 Sheets-Sheet 2
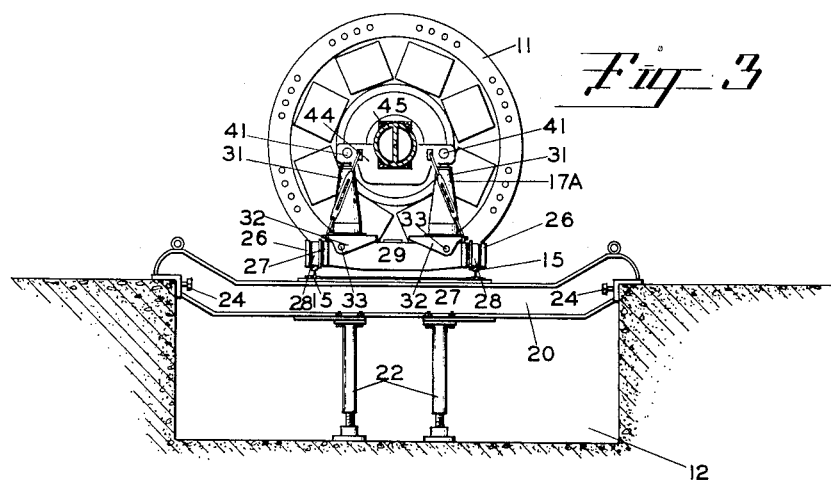
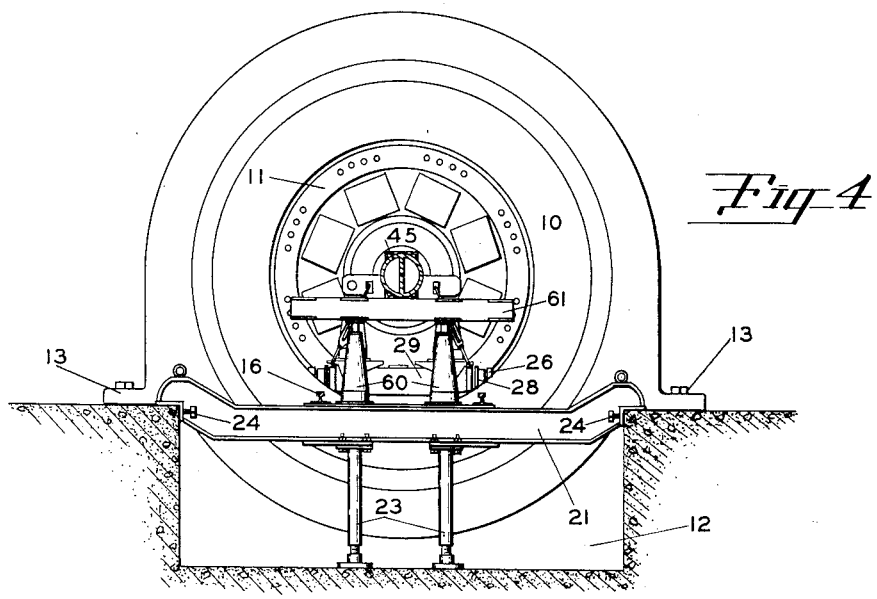
INVENTOR.
ARTHUR A. CORDER
ATTORNEY

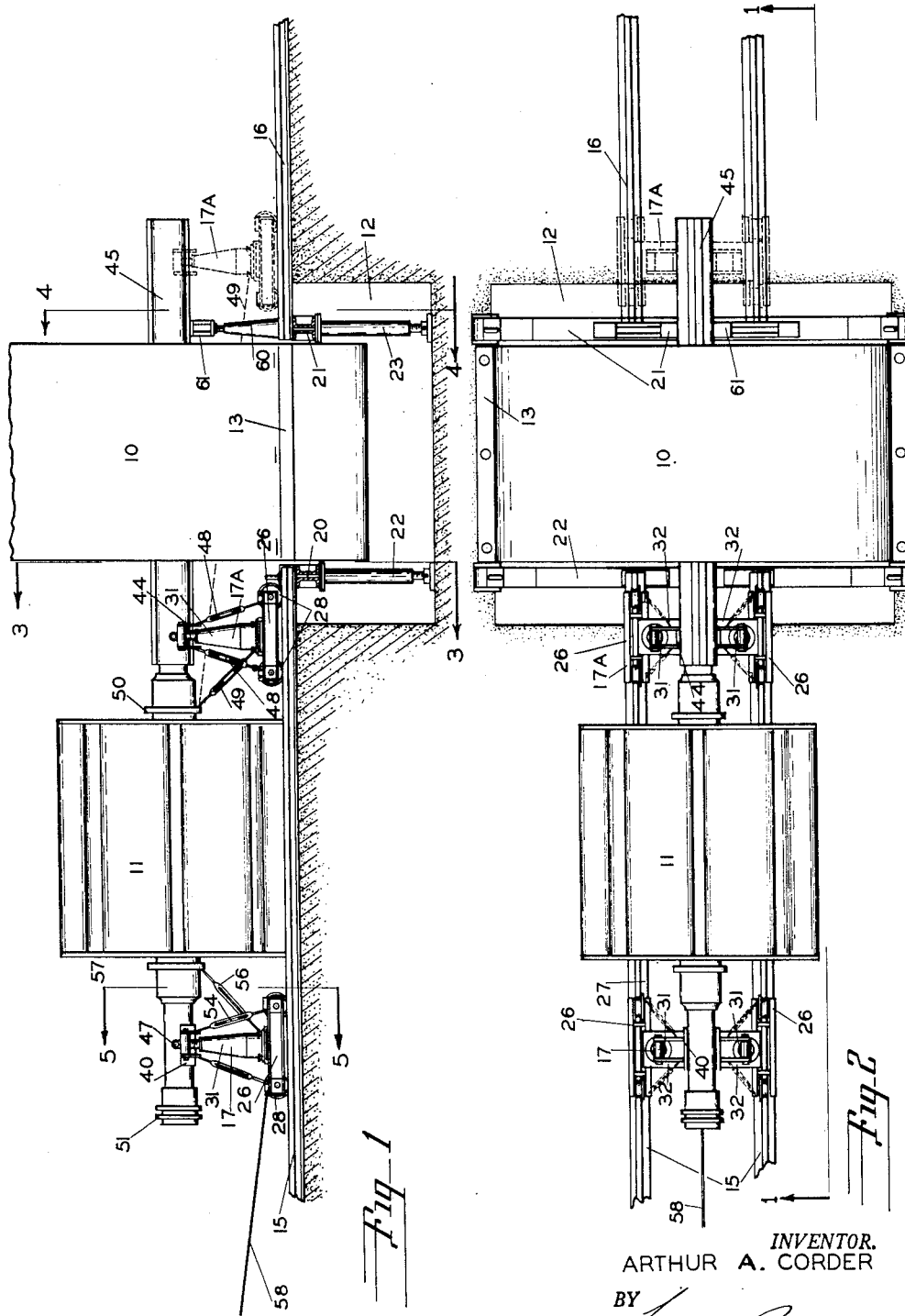

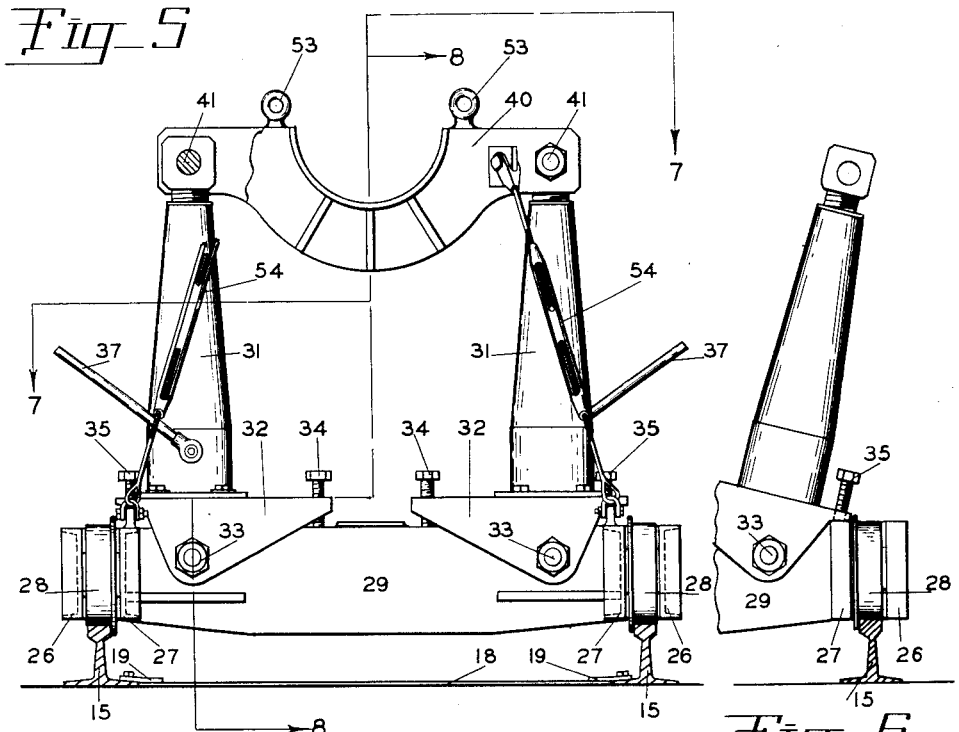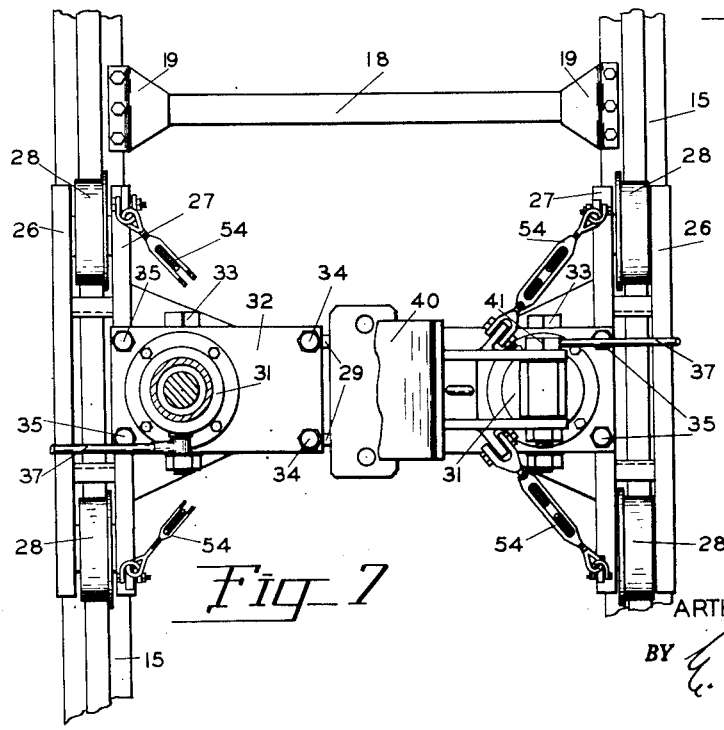

Jan. 6, 1953 A. A. CORDER 2,624,473
ROTOR CARRIER
Filed July 17, 1946 4 Sheets-Sheet 4
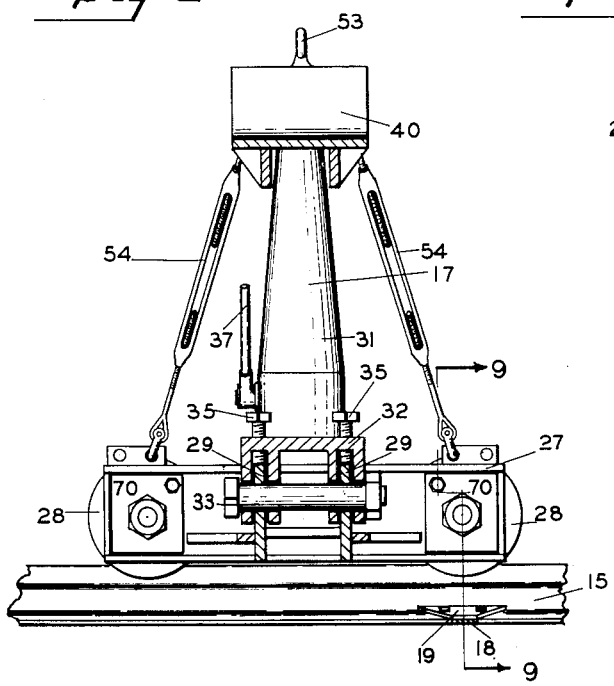
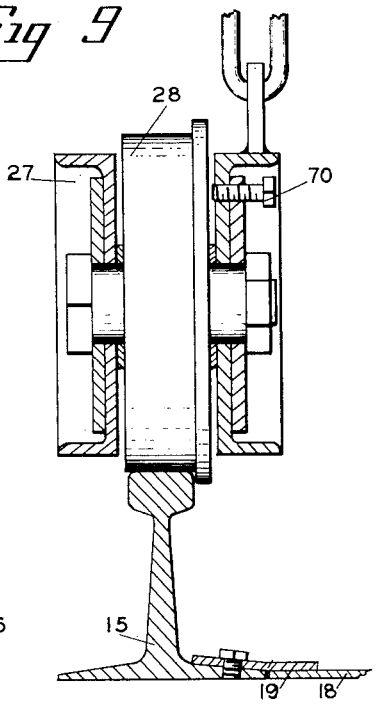
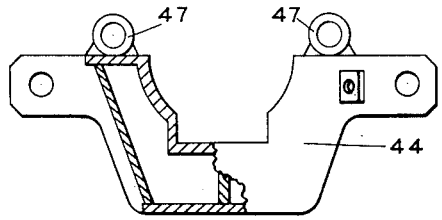
*INVENTOR.*
ARTHUR A. CORDER
BY
ATTORNEY Patented Jan. 6, 1953

2,624,473

UNITED STATES PATENT OFFICE 2,624,473

ROTOR CARRIER

Arthur A. Corder, Vancouver, Wash.

Application July 17, 1946, Serial No. 684,393

7 Claims. (Cl. 214—1)

The present invention relates to apparatus for use in connection with the assembly, dismantling and servicing of heavy rotating machinery.

Rotor units of large generators, motors, synchronous condensers and the like frequently weigh many tons and since the air gap between the rotor and stator is usually less than one inch it is a relatively difficult matter to assemble or remove the rotor with respect to the stator without injuring either. It is necessary that the rotor be moved in the axial direction on an even horizontal and vertical plane otherwise binding and damage may result. Heretofore rotors were assembled or removed with rather crude and hazardous procedures employing wooden timbers or cribbing mounted on steel rollers. Such arrangements are bulky, awkward and present distinct safety hazards and require an unduly large amount of time and energy in setting up and dismantling thereby contributing to excessive costs for such operations.

It is an object of the present invention, therefore, to provide a new and improved apparatus for use in assembling and in removing rotors with respect to stators of relatively large electrical rotating machinery which is relatively compact, safe and efficient.

A further object of the present invention is to provide a new and improved apparatus of the class described whereby rotor units may be withdrawn and assembled with respect to the stators quickly, and with a minimum of effort, and with a minimum of hazard with regard to either the personnel or the machinery.

Additional objects and advantages of the present invention will appear from the following description taken in connection with the accompanying drawings while the features of novelty will be pointed out with greater particularity in the appended claims.

In the drawings Fig. 1 is a side elevation illustrating the apparatus of the invention in accordance with one form thereof it being illustrated in connection with a typical form of rotating machine; Fig. 2 is a plan view of the apparatus shown in Fig. 1; Fig. 3 is a view taken along the line 3—3 of Fig. 1; Fig. 4 is a view taken along the line 4—4 of Fig. 1; Fig. 5 is an enlarged end view of one of the carriages of the invention and taken generally along the line 5—5 of Fig. 1 except that the rotor parts have been omitted; Fig. 6 is a fragmentary detail view illustrating the second position of adjustment of one portion of the carriage shown in Fig. 5; Fig. 7 is a plan view, partly in section, and taken along the line 7—7 of Fig. 5; Fig. 8 is a vertical sectional view taken along the line 8—8 of Fig. 5; Fig. 9 is an enlarged detail view taken along the line 9—9 of Fig. 8; and Fig. 10 is an enlarged view, partly in section, illustrating one detail shown in Fig. 3.

Referring more particularly to Figs. 1 and 2 a typical heavy electrical rotating machine is illustrated comprising a stator unit 10 and a rotor unit 11. The machine in this instance is a synchronous condenser though, it is to be understood, that any other electrical rotating machine is illustrated thereby. As is frequently the case with such machines the lower portion of the stator depends within a pit 12 the frame of the stator being provided with feet 13 which rest upon opposite edges of the pit walls. The extent of dependency within the pit is limited, however, to such a point that the lowermost portion of the inner diameter of the stator is slightly above the level of the floor surrounding the pit. In the drawings the opposite end bells and shaft bearing pedestals have been removed as well as such other detachable adjuncts such as the rotor fans.

The invention consists essentially of a pair of track units 15 and 16 one of which is adapted to be arranged on each of the opposite sides of the stator unit in parallel alignment with and symmetrically beneath the axis rotor unit and a pair of carriages indicated generally at 17 and 17A in Figs. 1 and 2. The tracks and carriages are accurately adjusted for supporting the rotor unit for movement in the axial direction as will be described more fully hereinafter.

The track units 15 and 16 are illustrated as comprising a pair of railroad rails of suitable length the bases of which, however, have been widened by welding additional portions to each of the opposite side edges thereof for providing increased stability thereto so as to minimize any tendency for the tracks to be tilted over and also to eliminate the necessity for providing special footings therefor. The rails are tied together at suitably spaced intervals by transversely extending tie straps 18 as shown more clearly in the views of Figs. 5 and 7 the opposite ends of the tie straps 18 being provided with gusset plates 19 secured by spaced apart bolts to the bases of the rails. The track units are thus rigidly secured together against movement relative to each other either in the lateral or longitudinal directions.

Since it is desirable to position the ends of the track units as closely as possible adjacent each of the opposite sides of the stator and overhanging the opposite ends of the pit 12 means are provided for supporting the overhanging ends of the track units, as illustrated more clearly in the views of Figs. 3 and 4. A pair of bridge members 20 and 21 are provided the opposite ends of which rest upon the opposite upper edges of the pit walls. The central section of the bridge members is underslung so that the upper surface thereof is level with the floor surrounding the pit 12. The central portion of the bridge members 20 and 21 are furthermore supported from the floor of the pit by pairs of screw jacks 22 and 23 respectively. Snugly fitting engagement of the bridge members with the opposite side walls of the pit is obtained by adjusting screws 24 and which serve to preclude shifting of the bridge members in the directional longitudinally thereof during usage.

The carriage 17, which is more fully illustrated in the views of Figs. 5 to 9 inclusive comprises a relatively low base frame including pairs of opposite side rails 26, 27 between which are rotatably journaled four wheels 28 two on each of the opposite sides of the carriage. Extending between the side rails defining the opposite sides of the carriage is a transversely extending structure 29 which is suitably secured and anchored by gusset plates to the side rails. A pair of vertically adjustable pedestal bracket means are mounted upon the transverse structure 29 of the carriage and which, in the embodiment shown, consist of similar mechanical screw jacks 31. Each of the screw jacks is secured to the upper surface of a supporting base 32 which in turn is provided with depending flanges and mounted for pivotal movement upon the carriage member 29 by transverse bolts 33. The upright position of the jacks 31 may be adjusted by the screws 34 and 35 threaded into the base 32 and engaging with the upper edges of the transverse member 29 of the carriage. As previously stated the jacks 31 in this instance are of a screw type and which may be operated by ratchet handles indicated by dotted lines 37, it being understood, that such handles would ordinarily be removed when not required. The upper ends of the jacks 31 are connected by a yoke 40 the opposite ends of the yoke being secured by bolts 41 to the heads of the jacks, the central portion of the yoke being shaped so as cooperatively to receive the bearing portion of the rotor shaft. The carriage 17A differs from the carriage 17 only insofar as it is provided with a yoke 44 connecting the upper ends of its jacks of a shape illustrated in Fig. 10 and which is adapted more particularly to cooperatively receive the extension tube 45 fitted cooperatively and telescopically over the end of the rotor shaft opposite the carriage 17.

It will be understood that the rotor unit may be suspended from an overhead crane or supported by any other suitable means while the bearing pedestals and end bells are removed on the opposite sides of the stator. Ordinarily the extension tube 45 will first be installed over the rotor shaft end which is to be drawn through the stator. The extension tube 45 itself may be of any suitable construction and sufficiently reinforced so that the weight of the rotor end may be supported by the carriage positioned under the end of the extension tube remote from the rotor. The length of the extension tube is sufficiently greater than the axial length of the stator unit so that the carriage 17A may be positioned under either end as illustrated in full line and also in dotted line in Fig. 1. As previously stated the yoke 44 of the carriage 17A is provided with an upwardly facing seat so shaped as cooperatively to receive the tube 45. The yoke 44 is preferably held against the underneath side of the tube 45 by means of a crane suitably connected to the eyebolts 47 and the jacks 31 of the carriage 17A are then adjusted for lateral positioning by means of the screws 34, 35 and for vertical extension by the ratchet handles 37 until the connecting bolts 41 can be inserted. The jacks are then elevated sufficiently to take the weight of the rotor end. The yoke 44 is then guyed to the carriage by means of turnbuckles 48 and connecting screws to the four corners of the carriage in order to preclude any possibility of tilting movements of the jacks relative to the base of the carriage during the removal of the rotor from the stator unit. The base of the carriage is further connected by means of a turnbuckle 49 to a convenient portion of the rotor providing suitable anchorage such as the fan ring 50 as illustrated in Fig. 1.

The carriage 17 is then assembled under the opposite end of the rotor. Since no extension tube is necessary the yoke 40 may be arranged directly beneath the bearing portion of the rotor shaft. Due to the presence of collector or exciter rings 51 on the outer end of the rotor shaft it may be necessary to spread the jacks 31 apart in order to provide sufficient clearance therebetween to permit rolling of the carriage beneath the shaft bearing portion. For this purpose the jacks may be tilted outwardly to a position as is illustrated in dotted lines in Fig. 6. The yoke 40 will also preferably be held by a crane connected to the eyes 53 against the underneath surface of the shaft bearing, the bearing seat of the yoke 40 having been first cleaned and lubricated. The jacks 31 are then adjusted and connected to the opposite ends of the yoke 40 and then further extended so as to take the weight of the armature. The yoke 40 is then guyed by turnbuckles 54 to the four corners of the carriage for stabilizing the same and the base frame of the carriage connected by the turnbuckle 56 to a convenient anchorage on the rotor such as the adjacent fan ring 57. The rotor may then be withdrawn from the stator by suitable tackle connected to the forward end of the carriage 17 and illustrated by the cable 58.

When the rotor has been withdrawn from the stator to the position shown in Figs. 1 and 2 the carriage 17A may be shifted from the position shown in dotted lines in Fig. 1 to the position shown in full lines on the opposite side of the stator. The weight of the end of the extension tube may be temporarily supported by means of jacks 60 positioned upon the bridge member 21 as illustrated in Fig. 4 a transverse beam 61 being provided across the upper ends of the jacks 60 for engaging with the underneath surface of the extension tube 45. With the weight thus transferred to the jacks 60 the carriage 17A may be lowered and dismantled and moved around to the opposite side of the stator and reassembled in a manner as previously described and as shown in full line in Fig. 1 between the rotor and the stator.

The extension tube 45, if desired, may be removed from the end of the rotor and the rotor supported by its bearing portion seated within a yoke member similar to the yoke member 40 substituted for the yoke member 44. With the turnbuckles 56 and 49 disconnected and supported by its bearings upon the carriage it may be rotated as may be required for servicing.

For precluding movement of the carriages when it is desired to retain the rotor in a predetermined position the carriage wheels may be locked by means of screws 70 threaded through one of the side rails and adjustable into engagement with the web of the wheels adjacent the periphery thereof and as shown more clearly in the enlarged detail view of Fig. 9.

For reassambling the rotor into the stator it will be obvious that the procedure will be substantially the reverse of that described above. Furthermore from the description given it may be clearly seen that the rotor may be moved either in or out of the stator exactly along its axis and without danger of contacting the stator or causing damage or injury thereto. The apparatus of the invention is sufficiently flexible so as to be readily adaptable for use in connection with rotating machinery of varying size.

Having described the invention in what are considered to be certain preferred embodiments thereof it is desired that it be understood that the specific details shown and described are merely illustrative and that the invention may be carried out by other means.

What I claim is:

1. In an apparatus for assembling and removing rotor units with respect to stator units of relatively heavy rotating machines, the combination comprising a pair of track units adapted to be positioned one on each of the opposite sides of the stator unit in parallel alignment with and beneath the axis of the rotor unit, a carriage mounted on each of said track units, each of said carriages including a yoke member and vertically adjustable upright means supporting said yoke member upon the carriage, adjustable pivotal means mounting said upright means upon said carriages permitting adjustment of said upright means in the direction transversely of the longitudinal direction of said track units, one of said yoke members being adapted for cooperatively receiving one end of said rotor unit, a tubular member adapted for fitting cooperatively over the opposite end of said rotor unit, the yoke member on the other carriage being adapted for cooperatively supporting said tubular member.

2. In an apparatus for use in assembling and in removing a rotor unit with respect to the stator unit of relatively heavy rotating electrical machines, the combination comprising a pair of track units to be positioned one on each of the opposite sides of the stator unit in parallel alignment with and beneath the axis of said rotor unit, a wheeled carriage on each of said track units, each of said carriages including a relatively low base frame and a pair of jacks mounted thereupon on each of the opposite sides thereof, a yoke member connected between the upper ends of said jacks extending transversely of said rotor, said yoke members being adapted for supporting the opposite ends of said rotor unit, means for tying said yoke members to the opposite ends of said carriages when in the rotor supporting condition.

3. In an apparatus for use in assembling and in removing a rotor unit with respect to the stator unit of relatively heavy rotating electrical machines, the combination comprising a pair of track units adapted to be positioned one on each of the opposite sides of the stator unit in parallel alignment with and beneath the axis of said rotor unit, a wheeled carriage on each of said track units, each of said carriages including a relatively low base frame and a pair of vertically adjustable jacks pivotally mounted thereupon adjacent each of the opposite sides thereof, said jacks being pivotally movable outwardly of said carriage, a yoke member detachably connected between the upper ends of each of said pair of jacks, said yoke members being adapted for supporting each of the opposite ends of said rotor unit, means for securing each of said jacks against pivotal movement when in the rotor supporting position.

4. In an apparatus for use in assembling and in removing a rotor unit with respect to the stator unit of relatively heavy rotating electrical machines, the combination comprising a pair of track units adapted to be positioned one on each of the opposite sides of the stator unit in parallel alignment with and beneath the axis of said rotor unit, a wheeled carriage on each of said track units, each of said carriages including a pair of laterally spaced apart jacks, yoke members connecting the upper ends of each of said pair of jacks, said yoke members being adapted for cooperatively receiving and supporting the opposite ends of said rotor unit, means for tying said yoke members to the opposite end portions of the corresponding carriage when in the rotor supporting position, means for tying each of said carriages to peripheral portions of said rotor unit remote from said carriages.

5. In an apparatus for use in assembling and in removing a rotor unit with respect to the stator unit of relatively heavy rotating electrical machines, the combination comprising a pair of track units adapted to be positioned one on each of the opposite sides of the stator unit in parallel alignment with and beneath the axis of said rotor unit, a wheeled carriage on each of said track units, said carriages each including a pair of laterally spaced apart jacks, said jacks being symmetrically arranged on each of the opposite sides of the rotor axis, a yoke member removably connected to the upper ends of each of said pair of jacks, the yoke member of one of said carriages being adapted for cooperatively receiving a shaft portion of one end of said rotor, a tubular member being adapted to be telescopically positioned over the shaft portion of the opposite end of said rotor, the yoke member of the second of said carriages being adapted for receiving cooperatively said tubular member at a point remote from stator whereby the rotor positioned within said stator may be moved axially therefrom with the opposite ends thereof supported on said carriages.

6. In an apparatus for use in assembling and in removing rotor units with respect to stator units of relatively heavy electrical rotating machines in which the lower portion of said stator depends within a pit, the combination comprising a pair of longitudinal track units adapted to be positioned one on each of the opposite sides of said stator unit, bridge members for spanning said pit adjacent each of the opposite sides of said stator unit, the ends of said track units next adjacent said stator unit being supported upon said bridge members, a carriage mounted on each of said track units, bracket means on one of said carriages for cooperatively receiving and supporting the shaft of one end of said rotor, a tubular member adapted to be telescopically positioned over the shaft of the opposite end of said rotor member, bracket means on said second carriage for cooperatively receiving and supporting the outer end of said tubular member remote from said rotor unit.

7. In an apparatus for use in assembling and in removing rotor units with respect to stator units of relatively heavy electrical rotating machines in which the lower portion of said stator depends within a pit, the combination comprising a pair of longitudinal track units adapted to be positioned one on each of the opposite sides of said stator unit, bridge members for spanning said pit adjacent each of the opposite sides of said stator unit, the ends of said track units next adjacent said stator unit being supported upon said bridge members, a carriage mounted on each of said track units, bracket means on one of said carriages for cooperatively receiving and supporting the shaft of one of said rotor, a tubular member adapted to be telescopically positioned over the shaft of the opposite end of said rotor member, bracket means on said second carriage for cooperatively receiving and supporting the outer end of said tubular member remote from said rotor unit, and means for supporting one end of said rotor unit through said tubular member upon the bridge member on the corresponding side of said stator to permit said second carriage to be shifted to the opposite side of said stator.

ARTHUR A. CORDER.

REFERENCES CITED

The following references are of record in the file of this patent:

UNITED STATES PATENTS

| Number | Name | Date |
|---|---|---|
| 1,195,147 | Mitchell | Aug. 15, 1916 |
| 1,682,472 | Baumberger et al. | Aug. 28, 1928 |
| 1,802,870 | Brown | Apr. 28, 1931 |
| 2,128,409 | Hager | Aug. 30, 1938 |
| 2,166,609 | Putnam | July 18, 1939 |
| 2,387,890 | Egge | Oct. 30, 1945 |

FOREIGN PATENTS

| Number | Country | Date |
|---|---|---|
| 116,938 | Great Britain | July 2, 1918 |
| 697,501 | Germany | Oct. 16, 1940 |